United States Patent Office 3,551,039
Patented Dec. 29, 1970

3,551,039
SYSTEM FOR UNATTENDED PROJECTION OF CLOSED LOOP FILM
Robert G. Hewitt, Minneapolis, Minn., assignor to Motion Media, Inc., Burnsville, Minn., a corporation of Minnesota
Filed Oct. 31, 1967, Ser. No. 679,416
Int. Cl. G03b 21/00
U.S. Cl. 352—126
5 Claims

ABSTRACT OF THE DISCLOSURE

A system for the unattended projection of closed loop film is described. Synchronization within the film transport system assures delivery of the film to the film gate with a minimum of wear on the film. Built-in fail-safe circuitry utilizes a safety interlock in conjunction with elements to sense and detect key parameters such as film breakage, nonoptimum film speed, and lamp failure. Detection of a malfunction results in a power shutdown and transmission, over rented telephone lines, for example, of an alarm to a central monitoring station.

---

The invention to which the following description relates is a system for the continuous display of visual images and, in particular, it relates to a system for the continuous unattended projection of a closed loop of motion picture film containing, in part at least, images intended for the purpose of advertising a sponsor's products or services.

There can be little question as to the enormous impact television has had on advertising as a means of communicating a sponsor's message. The "live" appearance of the image on the TV screen provides an unequalled captivation of its viewing audience. In general, other forms of advertising—the printed page, the billboard, the spoken word—have had to take a back seat to the immense drawing power of television.

The logical competition for TV is that other "live" medium—the motion picture. The idea of an advertising message projected on a movie screen is not new—"coming attractions" and short advertising film clips before the feature are commonplace. Even the broad concept of "billboard" advertising utilizing a projected image has been preempted by several patents in this field. However, up to this time, the projected image has not proved to be a practical mass medium of advertising. In a movie house, the exposure factor—the number of people who are exposed to the message—for the short running time which will be tolerated by a paying theater audience is too low to be practicable. Also, billboard ads employing the projected image have not proved feasible. Sophisticated advertising copy is very expensive to create. Only a national or large regional advertiser is in a position to underwrite such an expense. To offset the initial expense of the original film master, it would be necessary to distribute and utilize a large number of copies. This of course means a large number of projection facilities equipped to handle the continually changing mix of sponsor's copy coming to it. A projection facility attended by an operator is much too expensive a means of displaying the advertising message. Hundreds, even thousands, of such manned installations would have to be attended by skilled projectionists, and this during the usually difficult-to-staff evening hours. The difficulties and expenses inherent in creating and maintaining such an organization nationwide or even regionally are an almost insurmountable obstacle. Unattended projectors have heretofore proved impractical.

Traditionally, payment for advertising has been at a rate commensurate with exposure—for radio and TV: prime time; for magazines and newspapers: circulation; for billboards: location and traffic. Consequently, to convince a large budget advertiser to contract for the advertising of his product by means of an unattended motion picture projection scheme could be quite difficult. He would consider the chances for a possible malfunction to be too great. At best his message would be prevented from reaching the public and a malfunction could ruin an expensive piece of film.

This invention, which will be described in detail hereinafter as a motion picture projector makes advertising via unattended projection a practical and profitable reality. Motion pictures are not the only medium applicable here. Slide film strips containing advertising material could be projected by providing an appropriate viewing interval between frames.

In its principal embodiment, a motion picture projector, the invention provides for the isolation of the film to a very great degree from its "natural" enemies—heat, moisture, dirt, and friction. The projector is designed to prevent or dissipate heat, to seal out dirt and moisture, and to reduce wear, particularly by reducing friction. And equally important, if not more important, at least to the buyer of the advertising service, the projector is provided with complete safety interlocks and means for detecting, alarming, and recording the exact time and duration of any malfunction. Hence, the purchaser of advertising exposure would be given a record of actual projection time and would pay only for the actual projection time. Similarly, the vendor of the advertising services would be given prompt warning of any malfunction. He could then remedy it as quickly as possible and thereby maximize his revenue.

Accordingly, it is a general object of the invention to provide an automated projector which is capable of continuous unattended operation for reasonably long periods of time.

Another object of the invention is to provide a projector adapted for continuous unattended operation wherein safety interlock circuitry will deactivate said projector in the event of a malfunction.

A further object of the invention is to provide a projector adapted for continuous unattended operation wherein devices to sense, record, and alarm the occurrence of a malfunction are incorporated therein.

A still further object of the invention is to provide a projector adapted for continuous unattended operation wherein the design and configuration of the component parts is such as to minimize deterioration of the material being projected.

A still further object of the invention is to provide a motion picture projector which in its design and function accomplishes the aforesaid objects of the invention.

The invention will be described hereinafter as a motion picture projector. The novel features believed to be characteristic of the invention both as to organization and method of operation, together with further objects and advantages thereof, will be better understood from the specification considered in connection with the accompanying drawing in which a motion picture projector is disclosed as an illustrative embodiment of the invention by way of example. Other embodiments of the invention, e.g., a film strip projector or a videotape projector, would encompass essentially the same novel features. It is to be expressly understood that the drawing is for the purposes of illustration only and does not constitute a limitation of the invention.

Figure 1:
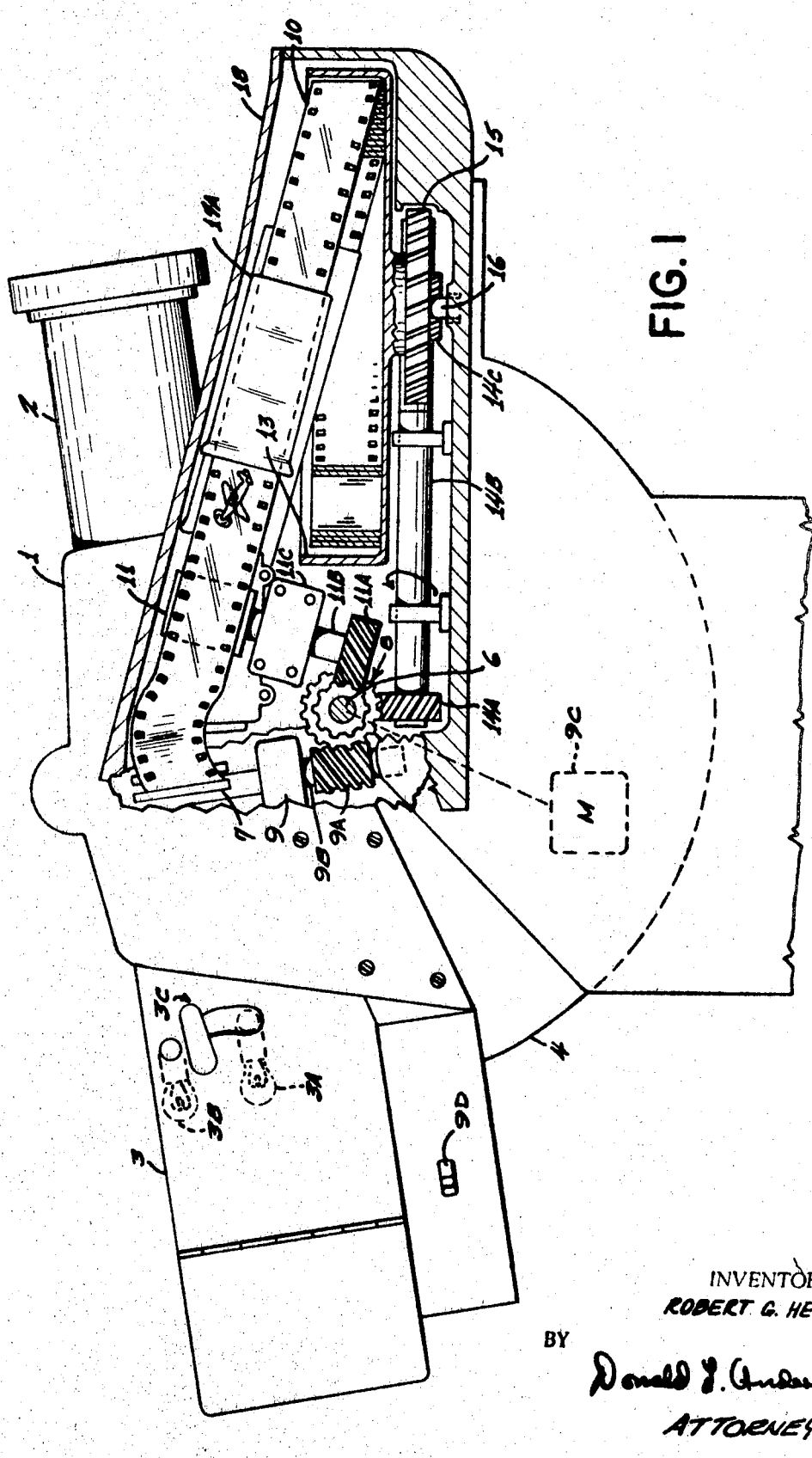
FIG. 1 is a vertical cross-section of a motion picture projector in accordance with the invention.

Referring specifically to FIG. 1, there is shown a vertical cross-section of a motion picture projector adapted for the unattended projection of motion film including a lens mount 1; adjustably affixed to the front of the lens mount is a lens 2; positioned behind the lens mount 1 and optically coupled therewith is a lamphouse 3 housing a projection light source, for example, lamp 3A and a built in turret-type spare lamp 3B which automatically replaces light source 3A through the movable turret assembly generally designated as 3C, in the event of the failure of lamp 3A. The lens mount 1 and lamphouse 3 are supported on a movable platform 4, which in turn is movably supported on a pedestal 5. The platform 4 is movable in a vertical displacement about pivot 6 also serving as the main drive shaft. Between the lamphouse 3 and the lens 2 in the projection aperture is positioned a film gate assembly generally designated as 7. Said film gate may be fitted with a shutter and is preferably of the water-cooled type. A main gear drive generally designated as 8 is drivably connected to the main drive shaft 6 and means are provided for converting the continuous rotary motion of said main gear drive 8 into a cyclical translational motion to intermittently transport the film 10 past said film gate 7, for example an intermittent sprocket drive 9 of the "geneva movement" type driven through gear 9A on shaft 9B, powered by motor 9C controlled by main switch 9D. The cyclical translational motion of the intermittent sprocket drive 9 is transmitted through the main gear drive 8 to the supply sprocket 11 through gear 11A and shaft 11B mounted through journal 11C, and also to return sprocket 12, gear 12A, shaft 12B, and journal 12C (all not shown) both of which assist in guiding and advancing film 10. The continuous loop of film 10 is supplied from an returned to the film supporting cylinder 13, through slack loops to allow for minor differences in film transport speed; the film supporting cylinder 13 is rotatably driven through gear 14A, shaft 14B, gear 14C, and gear 15 mounted on shaft 16 and is synchronized with the film transport assembly (main gear drive 8 and intermittent sprocket drive 9); the film 10 leaves and enters the film supporting cylinder 13 via the supply chute 17A and return chute 17B (not shown). To facilitate the return of the film strip 10 to the film supporting cylinder 13 via return chute 17B, it is preferable to provide a means for slightly bowing said film and thereby increasing its ridgidity as it leaves the return sprocket 12 and just prior to its entry into the mouth of return chute 17B.

The entire film handling assemblage is encased in a clear plastic dust tight cover 18, held in place by the lens mount 1 when in its closed position and protected from dust through dust seals 19, 20 (FIG. 2) positioned where the cover 18 meets the platform 4.

Figure 2:
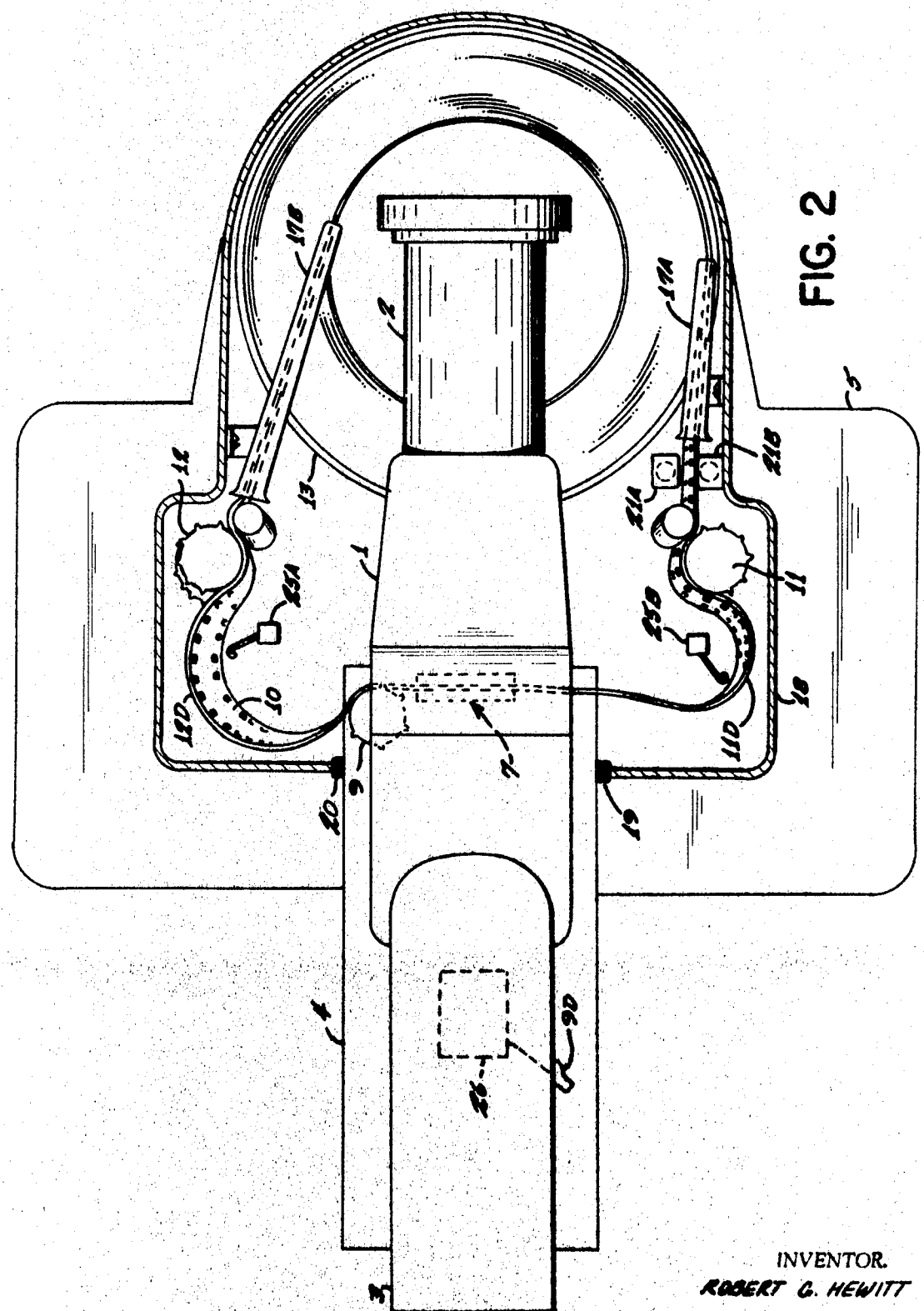
FIG. 2 is a top plan view of a motion picture projector in accordance with the invention.

Referring specifically to FIG. 2, there is shown a top plan view of a motion picture projector adapted for unattended projection of motion pictures and equipped with sensing devices to signal malfunction in the projector. A fail safe relay generally depicted as 26 detects a faulty lamp. Unacceptable deviations from normal film speed, as well as broken or jammed film (go or no go), are detected by a sensor, such as exciter lamp 21A shining through the passing sprocket holes of film 10 onto photocell 21B; the signal from photocell 21B being used as a go or no go control. Sensors, such as microswitches 25A and 25B, are positioned to detect broken film or unacceptable deviations in the slack loops 11D and 12D on either side of film gate 7.

Figure 3:
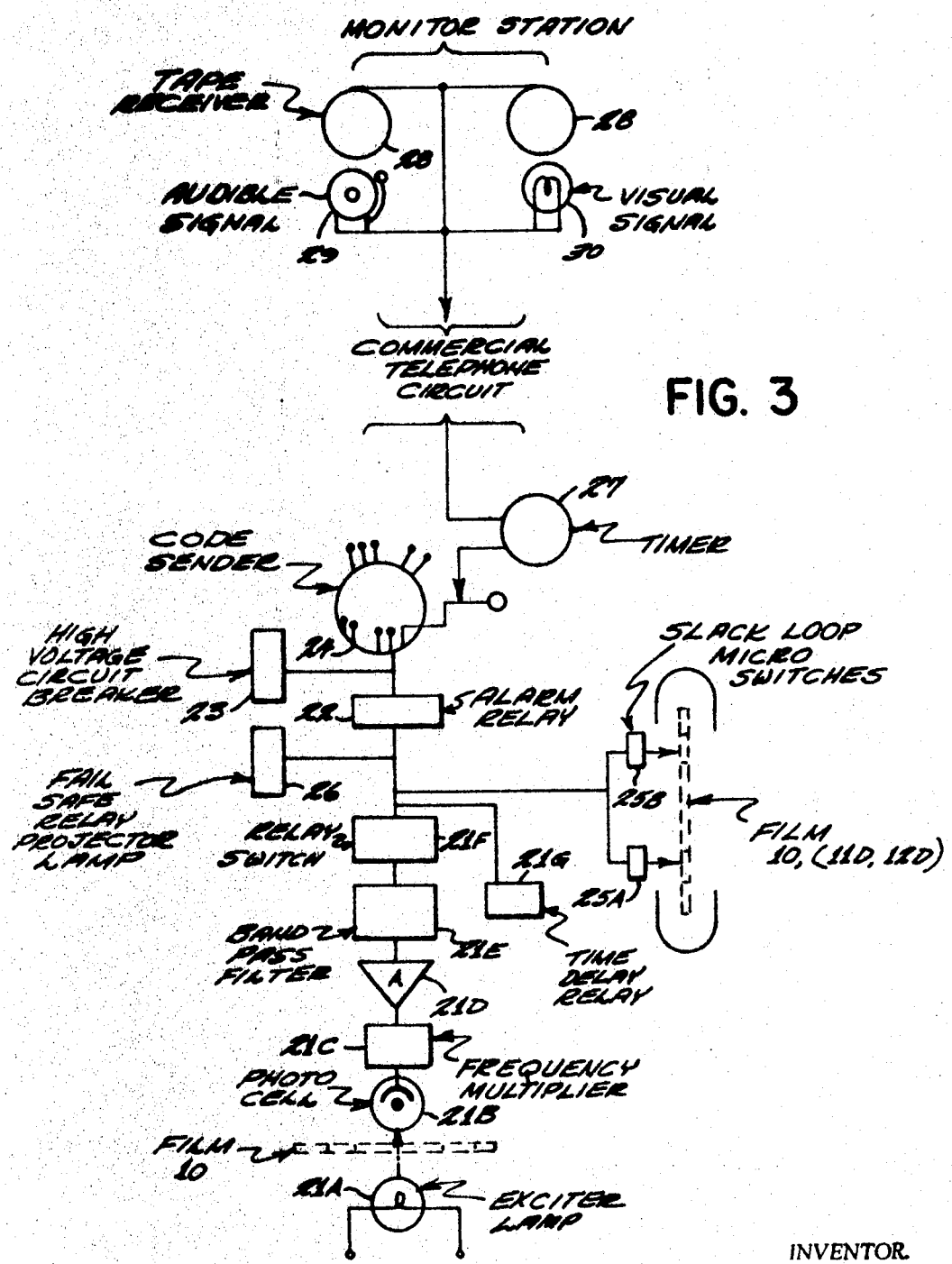
FIG. 3 is a simple block diagram sequence chart for a safety interlock and sensor/detector circuit to deactivate the power source and signal and alarm any malfunction.

Referring specifically to FIG. 3, there is shown a block diagram sequence chart for a safety interlock, sensing, detecting, and alarming circuit adapted, in the event of a malfunction, to disconnect the power source and signal and record said malfunction at a remote monitoring location. The particular circuit depicted is but one of a number of similar detector/sensor/relay systems which could accomplish the fail safe detection and alarming necessary to practicable unattended projection of motion picture film.

Timer 27, at the preselected time for projection, turns on the low voltage power, thereby preparing the main alarm relay 22 for performance of its signal and control functions. Upon attaining its ready state, alarm relay 22 activates the high voltage power through the high voltage circuit breaker 23. The projector will then start operation, provided and only so long as the slack loop microswitches 25A, 25B indicate a correct degree of slack loop in slack loops 11D, 12D. The projector then continues to run to attain normal operating speed. This takes but a few seconds, however, without some programmed safeguard, the film speed sensor circuit would automatically signal a malfunction (improper film speed). This would constitute a misleading signal. Consequently, a time delay relay 21G is placed in the film speed sensor circuit to provide a time delay to permit what should be attainment of normal operating speed before the circuit is in readiness for its sensing function. Upon activation of the film speed sensor circuit, a built-in power transfer simultaneously activates the projection lamp. However, any substantial deviation in film speed will cause an alarm. This is accomplished through the action of the exciter lamp 21A shining through the passing sprocket holes in film 10 onto photocell 21B, the signal from the photocell 21B passes to a frequency multiplier 21C (for example, a 4:1 solid state frequency multiplier), through an amplifier 21D (for example, a conventional low voltage amplifier), to a band pass filter 21E (for example, a solid state band pass filter), where if the frequency of the signal coming to the band pass filter 21E matches within a predetermined degree the programmed input, no signal goes to the relay switch 21F. However, in the event of no signal to the band pass filter 21E or a signal of sufficiently greater or lesser frequency than programmed, relay switch 21F will close causing a signal to go to the alarm relay 22, which in turn sends a signal to the code sender 24 and simultaneously opens the circuit breaker 23 thereby shutting down all operation until the malfunction is corrected. Similarly, a signal from the fail safe projector lamp relay 26 will activate alarm relay 22, as will a signal from either slack loop microswitch 25A, 25B.

The code sender 24 upon activation by the alarm relay 22 sends a predetermined location code out over a commercial telephone circuit to a monitor station. The incoming code activates a tape receiver 28 which records the location at which the malfunction is being alarmed and the time of the malfunction on a permanent record, for example a punch coded tape. Simultaneously an audible signal 29, for example a bell or chime, and a visual signal 30, for example a warning light, are activated. This warns the monitor station operator of a malfunction, thereby setting in motion corrective measures.

Upon diagnosis and correction of the malfunction, the service man resets the sensor circuits and timer, and records the time of reinstatement of service. Thereupon continuous monitoring is resumed. The signal circuits can be battery-powered to operate even in the event of a local or widespread power failure.

The cycle is completed when the timer 27, at the preselected time for cessation of projection, signals the alarm relay 22 and all power is turned off.

As a further safety refinement, there may be built into this alarm system a normal-operation shutdown sequence wherein when the time clock registers the end of the desired projection period, the projection lamp is turned off, but the projector's film transport system continues to run to allow the film gate to return to essentially ambient temperature. One way to monitor this would be to have a temperature probe located in the film gate which would register the gate temperature and permit shut-down only when the temperature of the gate had dropped to a sufficiently low temperature to prevent damage to that frame of film coming to rest in the gate. Thereupon all power would be extinguished by this final sequence in the ready and alarm relay.

In accordance with the invention, the projector described herein utilizes a series of key design features to eliminate to as great an extent as is practicable what are the usual causes of and the dire results of malfunction in a conventional motion picture projector. The particular lamp source selected will be of a type to provide a maximum degree of safety and automation within the illumination parameters of the specific installation, e.g., size of screen, distance, etc. A particularly preferred source is a North American Phillip's "pulse light." It provides an automatic built-in spare replacement in the event of failure of the primary lamp; it is water cooled and because of its extremely short flash (2.5 milliseconds) no further heat exhaust system is required; and to further reduce chances of mechanical failure, the synchronized pulse can be utilized to eliminate the requirement for a shutter thereby simplifying design and operation.

The film is placed forward of the lamp to separate it further from heat and to isolate it from a possible leak in the cooling system of the lamphouse and film gate. Similarly, the relatively large capacity of the film support cylinder 13 assures that all heat will dissipate from a given frame of film before that frame will be again projected.

The film format used is of the horizontally printed type as in Paramount's Horizontal Vista-Vision, thereby providing a relatively trouble-free film path and a simplified transport system. Variations in film travel resulting from differences in the angle created between the line of projection (extent of elevation of the lens and mount) and the plane of film transport will be confined to the slack loops 11D, 12D on both sides of film gate 7, between the gate and the supply and return sprockets 11, 12.

To reduce friction, it is preferred that the surfaces of cylinder 13 coming in contact with the film and the inner surfaces of the film guide chutes 17A, B be highly polished metal or constructed of or coated with a friction-reducing plastic surface.

The design of the film supporting cylinder 13, somewhat in the likeness of a phonograph turntable, synchronized to the speed of the other segments of the film transport, markedly reduces the friction which might otherwise be expected in the course of delivering and returning the film 10 from and to the cylinder 13. The film is held within support cylinder 13 in loose coils thereby minimizing friction of film against film. The rotational motion of the support cylinder 13 also reduces friction between the coils of film and the surface of the cylinder's base. However, the contact of the film coils with the cylinder's base, coupled with the rotational motion serves as a driving force pushing the peripheral coil of film forward out of the supply chute 17A and onto supply sprocket 11. In this manner, the supply sprocket 11 functions more as a film guide to create and confine the supply slack loop 11D than it functions as a "driver" pulling film from the sprocket cylinder. In this manner wear and strain at the film sprocket holes is markedly reduced. In a similar manner the pulling action of the rotation of the supply cylinder 13 minimizes friction and wear in the return sequence (slack loop 12D, return sprocket 12, and return chute 17B).

It has been found that it is particularly advantageous to restrict contact with the film to its edges. All surfaces of the projector coming in contact with the film may be designed so as to provide recesses wherein the emulsion of the film does not impinge directly on any surface and all support and/or transport is accomplished through the edges of the film only.

Having done everything generally practicable to reduce the chances of a malfunction due to heat or wear, the invention provides, in addition, a positive interlock/alarming/recording circuit which in the event of a malfunction shuts off all power to the projector and essentially simultaneously therewith causes an alarm or alarms to signal a malfunction and records the location and the time and date of the malfunction. The reliability of this type of closed loop alarm circuit is well founded by many years in service as fire and burglar alarm systems. The signal circuits are relatively inexpensive and can be rented from a local telephone company.

The ability of documenting exactly when a malfunction has occurred and its duration is extremely important to a purchaser of advertising exposure. It assures him that he will be given full value and pay only for the actual exposure obtained.

While there has been shown and described what is at present the preferred embodiment of the invention, various modifications and departures will now occur to those skilled in the art, and it is intended to cover in the appended claims all such modifications as are within the spirit and scope of the invention.

I claim:

1. A projection system for unattended projection of closed loop film comprising in combination:
a remote unattended projector; circuitry within said projector to detect projector malfunctions of film breakage, power failure, lamp failure, malformation of slack loop, and film speed deviations; fail-safe circuitry within said projector to turn off said projector and create an alarm signal upon detection of said projector malfunctions; and a monitor station capable of receiving said alarm signal from said circuitry.

2. The projector of claim 1 comprising as a subcombination:
a pedestal and support having mounted thereon a lamphouse, lens mount, and lens; a light source mounted within said lamphouse; a projection aperture; a closed loop of film; continuous drive means; and a film support cylinder drivably connected to said continuous drive means and synchronized therewith and with an intermittent means to convert the rotary motion of said continuous drive means to a cyclical translational motion, and thereby intermittently transport said film past said projection aperture.

3. The malfunction detecting and fail-safe alarming circuitry of claim 1 comprising as a subcombination:
a timer;
a main alarm relay;
a high voltage circuit breaker;
switching means to detect malformation in the slack loops of the closed loop film;
a time delay relay;
a fail-safe projection lamp relay;
film speed detecting means; and
a code sender to transmit a malfunction signal initiated by any of said lamp relay, film speed detecting means, and switching means and transmitted to said code sender by said main alarm relay.

4. The projector of claim 2 wherein said projector is a motion picture projector, the improvement therein comprising a means for transporting closed loop motion picture film with markedly reduced mechanical wear, said means comprising a rotating film support cylinder, said rotation of the film support cylinder being synchronized with the translational motion resulting from the conversion by an intermittent means of the rotary motion of a continuous drive means into cyclical translational motion for the guiding and transport of said closed loop motion picture film past a projection aperture, and said rotation of said film support cylinder also being synchronized with said continuous drive means, whereby the rotational motion of said film support cylinder provides the major pushing and pulling action necessary to effect the transport of said closed loop motion picture film and said transport is accomplished with markedly reduced mechanical wear.

5. The projection system of claim 1 wherein said alarm signal is transmitted to said monitor station via commercial telephone lines.

References Cited

UNITED STATES PATENTS 3,147,482  9/1964  Urban _____ 352—155X

JOHN M. HORAN, Primary Examiner

R. A. WINTERCORN, Assistant Examiner

U.S. Cl. X.R.

352—128, 155, 159, 179